United States Patent
Magda et al.

(10) Patent No.: US 11,855,429 B2
(45) Date of Patent: Dec. 26, 2023

(54) ELECTRIC JUNCTION BOX ASSEMBLY WITH REMOVABLE COVER

(71) Applicant: Sumitomo Wiring Systems, Ltd., Yokkaichi (JP)

(72) Inventors: Martin Magda, Farmington Hills, MI (US); Brian Carnick, Farmington Hills, MI (US)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 321 days.

(21) Appl. No.: 17/388,083

(22) Filed: Jul. 29, 2021

(65) Prior Publication Data
US 2023/0029457 A1    Feb. 2, 2023

(51) Int. Cl.
H02G 3/08    (2006.01)
H02G 3/14    (2006.01)
H02G 3/10    (2006.01)

(52) U.S. Cl.
CPC .............. *H02G 3/14* (2013.01); *H02G 3/081* (2013.01); *H02G 3/10* (2013.01)

(58) Field of Classification Search
CPC ........... H02G 3/08; H02G 3/081; H02G 3/10; H02G 3/14; H02G 3/088; H05K 5/00; H05K 5/02; H05K 7/00; H01R 13/46; B60R 16/00; B60R 16/02
USPC ............ 174/50, 520, 66, 67, 542, 535; 220/3.2–3.9, 4.02, 241, 242; 439/76.1, 439/76.2, 949; 312/223.1, 223.6; 361/600, 601, 622, 641
See application file for complete search history.

(56) References Cited

U.S. PATENT DOCUMENTS

| | | | | |
|---|---|---|---|---|
| 6,635,823 B2 * | 10/2003 | Kasai | .................... | H02G 3/088 174/59 |
| 6,912,349 B2 * | 6/2005 | Clark | .................. | G02B 6/4441 174/50 |
| 7,507,094 B2 * | 3/2009 | Kubota | ................ | H01R 13/631 439/76.2 |
| 8,163,994 B2 * | 4/2012 | Taniguchi | .............. | H02G 3/081 439/76.1 |
| 8,455,759 B2 * | 6/2013 | Mortun | .................. | H02G 3/088 174/50 |
| 8,969,723 B2 * | 3/2015 | Hirasawa | ............... | H02G 3/088 439/76.1 |
| 11,217,976 B2 * | 1/2022 | Tomita | .................. | H01B 7/0045 |
| 11,394,187 B2 * | 7/2022 | Tashiro | ............... | B60R 16/0238 |

\* cited by examiner

*Primary Examiner* — Angel R Estrada
(74) *Attorney, Agent, or Firm* — Honigman LLP

(57) ABSTRACT

An electric junction box assembly includes a case, a housing and a cover. A housing is disposed on an outer surface of the case. The housing includes a back wall and a pair of supports disposed on the back wall. The supports are spaced apart from each other and each support includes an upper support member and a lower support member spaced apart from each other so as to define an opening. The upper support member has an arcuate inner surface and the lower support member has an arcuate inner surface each having a radius greater than the opening. The cover includes an axial rod having a thickness smaller than a height of the opening and a width greater than the height of the opening, wherein a rotation of the axial rod prevents the cover from being dislodged from the opening.

20 Claims, 5 Drawing Sheets

ELECTRIC JUNCTION BOX ASSEMBLY WITH REMOVABLE COVER

TECHNICAL FIELD

The present specification generally relates to an electric junction box assembly and more particularly to an electric junction box assembly having a removable cover.

BACKGROUND

In general electric junction box assemblies are used in a platform, such as an automotive vehicle, to distribute power throughout the vehicle. The electric junction box assembly includes an upper case and a lower case that are coupled together. The lower case is configured to hold an electric circuit assembly having a circuit board and a plurality of electric components mounted to the circuit board. The electric components are configured to distribute power from a power source, such as a battery.

The upper case is spaced apart from the lower case so as to define a storage space. The electronic components are housed within the storage space. The electric junction box may further include a jump start housing. The jump start housing includes a jump start bolt which is electrically connected to the battery. Conventional jump start housings are closed by a jump start cover. In some aspects, the jump start cover is removably attached to the jump start housing and may be inadvertently dislodged from the jump start housing. Such an occurrence is problematic as the jump start bolt remains unprotected.

Accordingly, it remains desirable to have an electric junction box having a jump start housing, wherein the jump start cover is mounted so as to be difficult to inadvertently dislodge.

SUMMARY

In one aspect of an electric junction box assembly, the electric junction box assembly is configured to house an element. The electric junction box assembly includes a case. The case has a first wall bounding a space for holding a plurality of electric components.

The electric junction box assembly includes a housing. The housing is disposed on an outer surface of the first wall. The element is disposed within the jump start housing. The housing includes a back wall, an outer side wall, and a front wall. The housing further includes a pair of supports disposed on the back wall. The supports are spaced apart from each other. Each of the supports includes an upper support member and a lower support member. The upper support member and the lower support member are spaced apart from each other so as to define an opening. The upper support member has an arcuate inner surface and the lower support member has an arcuate inner surface each having a radius greater than the opening.

The cover includes an axial rod having a width that is greater than the height of the opening. The axial rod includes a pair of intermediate portions having a thickness that is smaller than a height of the opening. The pair of intermediate portions have a thickness which is smaller than a height of the opening and a width which is greater than the height of the opening, wherein a rotation of the axial rod prevents the cover from being dislodged from the opening.

In one aspect, the upper support member and the lower support member are offset from each other along a width of the housing. The axial rod may include a pair of peripheral stops and a pair of inner stops. Each of the pair of intermediate portions is disposed between a corresponding one of the pair of peripheral stops and the pair of inner stops. Each of the pair of intermediate portions may include a pair of guides spaced apart from each other and opposite of each other. In one aspect, the guides may be arcuate and have a radius generally the same as or generally equal to a radius of the arcuate inner surface of the upper support member and the lower support member.

In another aspect, the case includes a resilient stop. The resilient stop is disposed on the first wall and adjacent the back wall of the housing. A distal end of the resilient stop extends beyond the first wall so as to limit a rotation of the cover. The resilient stop is formed of a material configured to naturally return the resilient stop to a resting position, wherein the resilient stop prevents the cover from being rotated past the resilient stop. The resilient stop includes a cam surface, the cam surface is angled outwardly with respect to the first wall.

In yet another aspect, the electric junction box includes a rib disposed on the first wall. The rib has a dimension configured to engage a peripheral edge of the cover. The rib prevents the cover from rattling due to environmental forces which may cause the cover to vibrate.

In another aspect of an electric junction box assembly, the electric junction box assembly is configured to house a jump start bolt. The electric junction box assembly includes an upper case. The upper case has a first wall bounding a space for holding a plurality of electric components.

The electric junction box assembly includes a jump start housing and a cover. The jump start housing is disposed on an outer surface of the first wall. The jump start bolt is disposed within the jump start housing. The jump start housing includes a back wall, an outer side wall, and a front wall.

The jump start housing further includes a pair of supports disposed on the back wall. The supports are spaced apart from each other. Each of the supports includes an upper support member and a lower support member. The upper support member and the lower support member are spaced apart from each other so as to define an opening. The upper support member has an arcuate inner surface and the lower support member has an arcuate inner surface each having a radius greater than the opening.

The cover includes an axial rod having a width that is greater than the height of the opening. The axial rod includes a pair of intermediate portions having a thickness that is smaller than a height of the opening. The pair of intermediate portions have a thickness which is smaller than a height of the opening and a width which is greater than the height of the opening, wherein a rotation of the axial rod prevents the cover from being dislodged from the opening.

In one aspect, the axial rod may include a pair of peripheral stops and a pair of inner stops. Each of the pair of intermediate portions is disposed between a corresponding one of the pair of peripheral stops and the pair of inner stops. The electric junction box assembly may further include a rib disposed on the first wall. The rib may have a dimension configured to engage a peripheral edge of the cover. In such an aspect, the rib prevents the cover from rattling due to environmental forces which may cause the cover to vibrate. In another aspect, the upper support member and the lower support member are offset from each other along a width of the housing.

The opening may be offset between 5 and 15 degrees from a plane taken along a length and width of the jump start housing. Each of the pair of intermediate portions may include a pair of guides spaced apart from each other and opposite of each other. The guides may be arcuate and have a radius generally the same as a radius of the arcuate inner surface of the upper support member and the lower support member.

In another aspect, the case includes a resilient stop. The resilient stop is disposed on the first wall and adjacent the back wall of the housing. A distal end of the resilient stop extends beyond the first wall so as to limit a rotation of the cover. The resilient stop is formed of a material configured to naturally return the resilient stop to a resting position, wherein the resilient stop prevents the cover from being rotated past the resilient stop. The resilient stop includes a cam surface, the cam surface is angled outwardly with respect to the first wall. The cam surface may taper from a distal end to a proximal end.

Accordingly, the electric junction box assembly includes a housing having a cover, wherein the cover is mounted onto the housing in a manner which helps prevent the cover from being inadvertently dislodged. The electric junction box assembly may be further configured to prevent the cover from rattling.

BRIEF DESCRIPTION OF THE DRAWINGS

The embodiments set forth in the drawings are illustrative and exemplary in nature and not intended to limit the subject matter defined by the claims. The following description of the illustrative embodiments can be understood when read in conjunction with the following drawings, where like structure is indicated with like reference numerals and in which:

DETAILED DESCRIPTION OF PREFERRED EMBODIMENTS

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on," "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Referring generally to the figures, embodiments of the present disclosure include an upper case for use in an electric junction box assembly having a housing for housing an element such as a jump start bolt. The housing is closed and opened by a cover. The housing and the cover are configured to prevent the cover from being inadvertently dislodged when the cover is in the open position.

Figure 1:
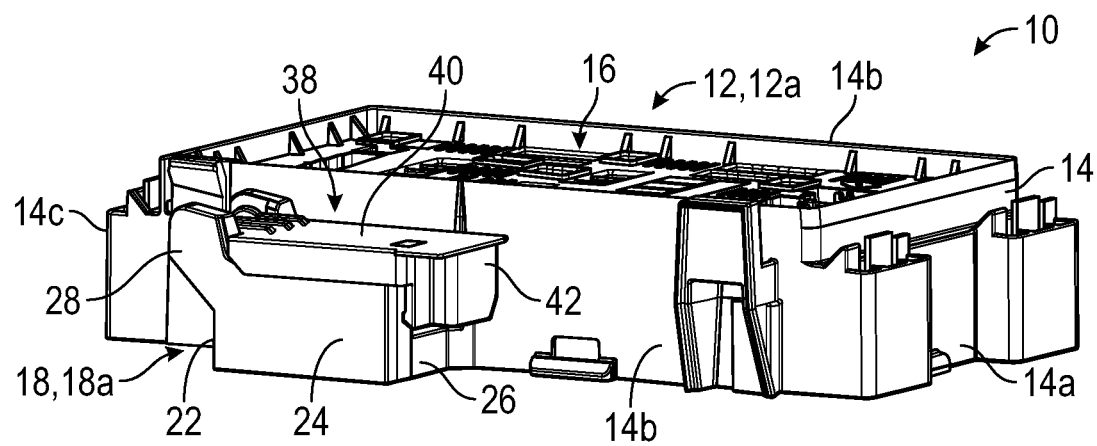
FIG. 1 is an exemplary depiction of an electric junction box assembly according to one or more embodiments illustrated herein.
Figure 2:
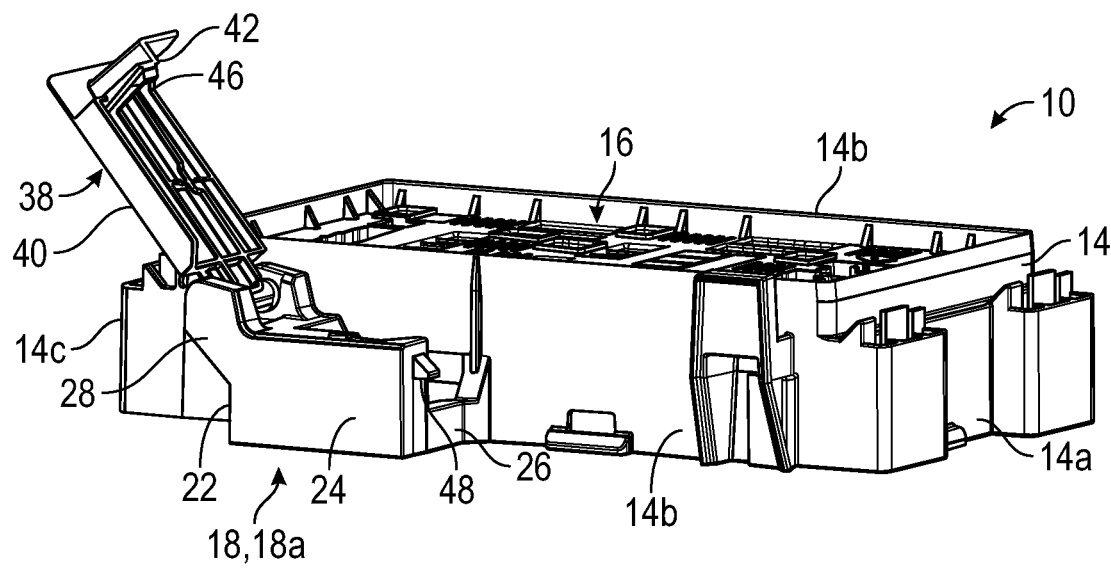
FIG. 2 is a view of the electric junction box assembly shown in FIG. 1 with the cover in the open position.

With reference first to FIGS. 1 and 2, a perspective view of an illustrative embodiment of an electric junction box assembly 10 is provided. The electric junction box assembly 10 is configured to house a plurality of electric components (not shown). Such electric components illustratively include a relay switch, fuses and the like.

The electric components are configured to direct power from a power source (not shown) such as a battery to various actuators, motors and devices (not shown). For illustrative purposes, the electric junction box assembly 10 disclosed herein is described within the context of an automotive vehicle. However, it should be appreciated that the electric junction box assembly 10 is described herein in the context of an automotive vehicle for illustrative purposes but may be used in other applications. Accordingly, a description of the electric junction box assembly within the context of an automotive vehicle is not limiting to the scope of the appended claims.

The electric junction box assembly 10 includes a case 12 configured to house the electric components. In one aspect, the case 12 may include an upper case (not shown) mounted onto a lower case 12a. For illustrative purposes, the electric junction box assembly 10 is described as having only lower case 12a. The lower case 12a is formed of a material suitable for injection molding. Preferably, the lower case 12a is formed as a unitary piece and manufacture from a material suitable for an injection molding process, such material illustratively includes polypropylene, Acrylonitrile butadiene styrene, polyoxymethylene, polycarbonate and the like. It should be appreciated that the shape and dimensions of the electric junction box assembly 10 are provided for illustrative purposes only and it may deviate from what is shown in the drawings without limiting the scope of the appended claims.

The lower case 12a includes a first wall 14. The first wall 14 is dimensioned to form a generally cuboidal shape. In particular, the first wall 14 may include a front portion 14a, a pair of side portions 14b and a back portion 14c. As used herein, a reference made to a part using the term "front" refers to a position corresponding to the front portion 14a, a reference made to a part using the term "back" refers to a position corresponding to the back portions 14c and a reference made to a part using the term "side" refers to a position corresponding to any one of the side portions 14b. The first wall 14 bounds a substrate 16 having a plurality of slits for accommodating the electric components.

The electric junction box assembly 10 includes a housing 18. The housing 18 is disposed on an outer surface of the first wall 14 of the upper case 12. For illustrative purposes, the housing 18 is shown displaced on a side portion 14b of the first wall 14. However, it should be appreciated that the housing 18 may be disposed along the front portion 14a or the back portion 14c of the first wall 14 without deviating from the scope of the appended claims. The housing 18 is configured to accommodate an element 20. The housing 18 includes a back wall 22, an outer side wall 24, and a front wall 26 that are formed to the first wall 14 so as to define a generally cuboidal shape. The element 20 is disposed within the bounds of the back wall 22, outer side wall 24 and the front wall 26.

The housing 18 further includes a pair of supports 28 disposed on the back wall 22. The supports 28 are spaced apart from each other along a width "$W_H$" of the housing 18. Each of the supports 28 includes an upper support member 30 and a lower support member 32. The supports 28 are configured to receive a cover 38. The cover 38 is rotatably mounted to the supports 28. FIG. 1 shows the cover 38 in a closed position, and FIG. 2 shows the cover 38 in an open position.

Figure 3:
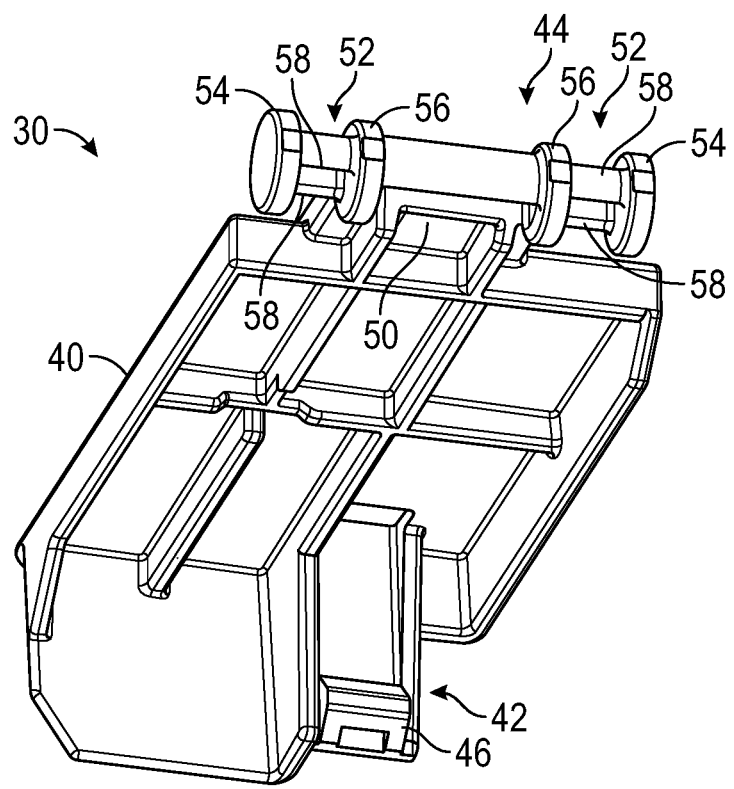
FIG. 3 is a perspective view of the cover shown in FIG. 1 taken from the bottom.

With reference now to FIG. 3, the cover 38 includes a top wall 40, a first attachment piece 42 and an axial rod 44. The axial rod 44 and the first attachment piece 42 are mounted to the top wall 40 and disposed on opposite ends of the top wall 40. The first attachment piece 42 is illustratively shown as a planar member having a first catch 46 disposed at a distal end thereof. The first catch 46 is configured to engage a second catch 48 disposed on the front wall 26 of the housing 18 so as to secure the cover 38 to the housing 18.

The axial rod 44 is connected to the top wall 40 by a neck 50. The neck 50 extends outwardly from a peripheral edge of the top wall 40 so as to displace the axial rod 44 from the peripheral edge of the top wall 40. The axial rod 44 is an elongated member configured to provide an axis of rotation for the cover 38.

In one aspect, the axial rod 44 includes a pair of intermediate portions 52 spaced apart from each other. Each intermediate portion 52 may include a pair of peripheral stops 54 and a pair of inner stops 56. Each of the intermediate portions 52 is disposed between a corresponding one of the pair of peripheral stops 54 and the pair of inner stops 56. A pair of guides 58 are disposed on opposite sides of each of the intermediate portions 52 so as to extend between a corresponding one of the pair of peripheral stops 54 and the pair of inner stops 56. The peripheral stops 54 and the inner stops 56 are spaced apart from each other so as to accommodate a width "$W_S$" (shown in FIG. 9) of the support 28.

Figure 4:
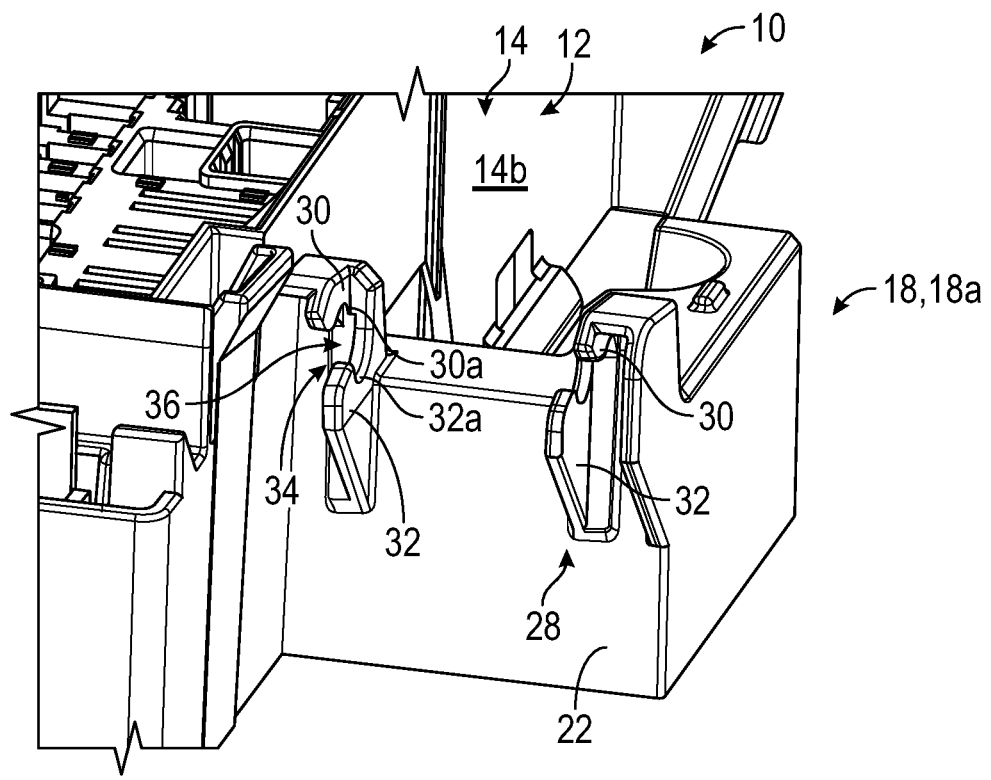
FIG. 4 is an isolated view of the housing shown in FIG. 1 taken from the back.

With reference now to FIG. 4, the upper support member 30 and the lower support member 32 are spaced apart from each other so as to define an opening 34. The upper support member 30 and the lower support member 32 are positioned so as to be elevated above the back wall 22, outer side wall 24 and the front wall 26. The upper support member 30 and the lower support member 32 are displaced from the back wall 22 in a direction away from the front wall 26. The upper support member 30 has an arcuate inner surface 30a and the lower support member 32 has an arcuate inner surface 32b each having a radius greater than the opening 34. The arcuate inner surface 30a of upper support member 30 and the arcuate inner surface 32a of the lower support member 32 cooperate with each other to define a hole 36 having a generally circular cross-section as taken along a height of the support 28. The opening 34 has a height "$H_O$" (shown in FIG. 6), as measured by the distance between the lower support member 32 and the upper support member 30 which defines the opening 34. The hole 36 has a diameter greater than the height of the opening 34 and is open to the opening 34.

The upper support members 30 are formed on opposite sides of the housing 18, so as to place the lower support member 32 between the upper support members 30. For illustrative purposes, the lower support members 32 are shown as having a triangular shape having a rounded end. However, it should be appreciated that the shape of the upper support members 30 and the lower support member 32 provided in the illustrations are illustrative and not limiting. The upper support member 30 and the lower support member 32 are offset from each other along a width "$W_H$" of the housing 18.

Figure 5:
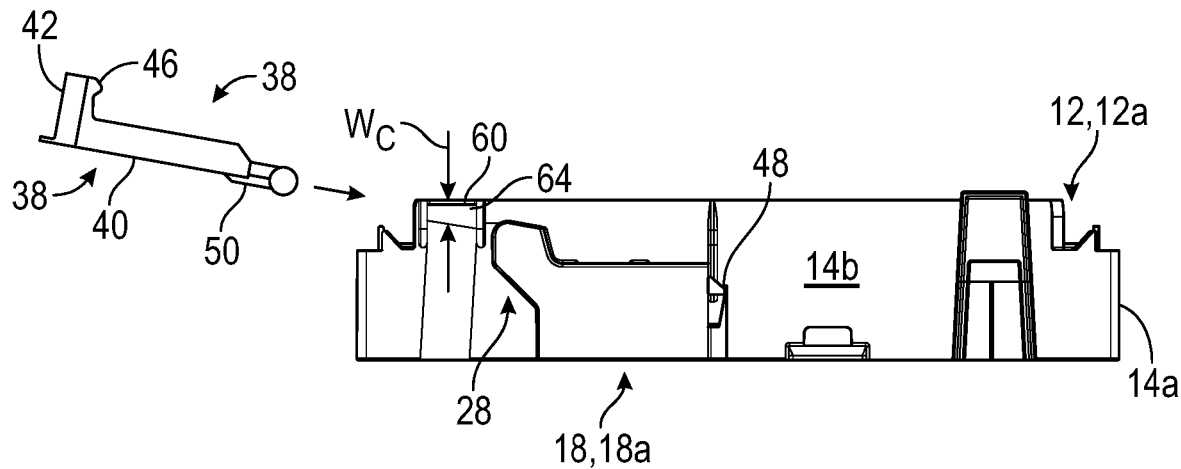
FIG. 5 is an exploded view of the electric junction box assembly.
Figure 6:
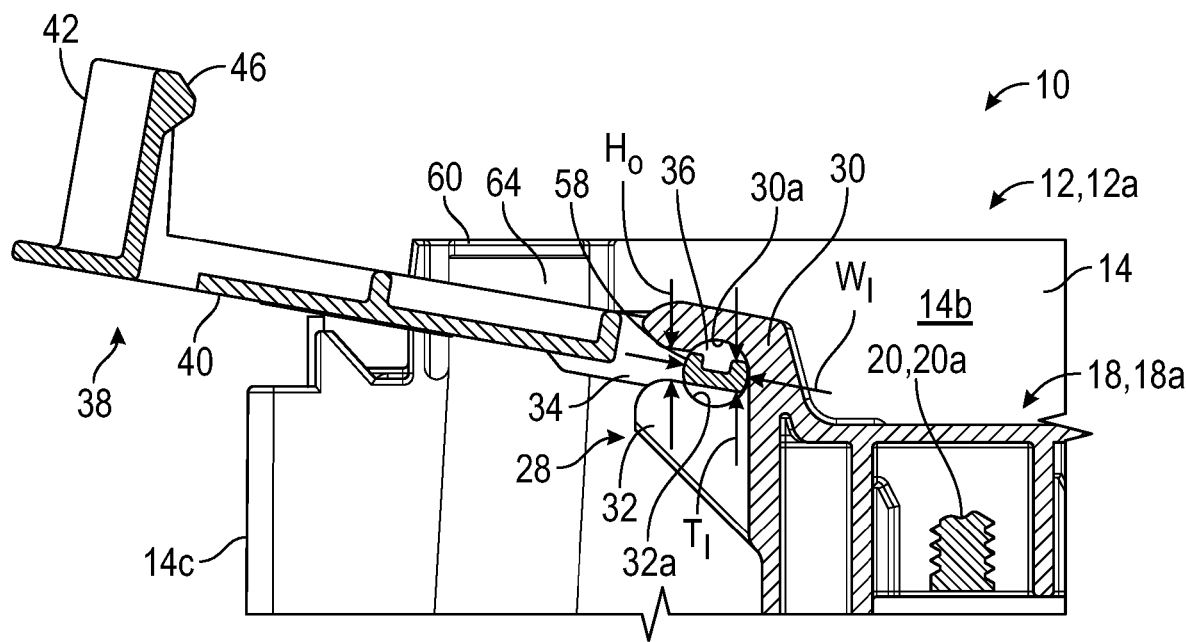
FIG. 6 is a cross-sectional view of FIG. 1 taken along line 6-6 showing the cover in an insert position.

With reference now to FIGS. 5 and 6, the cover 38 is shown mounted to the housing 18 in an insert position, as will be described in greater detail below. FIG. 6 illustrates an aspect of the axial rod 44, wherein the axial rod 44 has a width "$W_I$" that is greater than the height of the opening 34 of the support 28. The intermediate portion 52 has a thickness "$T_I$" which is slightly less than the height "$H_O$" of the opening 34 so as to provide a specific angle of insertion. FIG. 5 indicates the angle of insertion by the solid arrow. In particular, the cover 38 must be placed in the orientation shown and inserted along the axial length of the arrow so as to fit the intermediate portions 52 into the opening 34. FIG. 6, illustrates the function of the guides 58. The guides 58 have an arcuate outer surface which have a radius generally the same as a radius of the hole 36 defined by the arcuate inner surface of the upper support member 30 and the lower support member 32. As such, the cover 38 may rotate within the supports 28. However, as the width "$W_I$" of the intermediate portions 52 is greater than the height "$H_O$" of the opening 34. The opening is offset between 5 and 15 degrees from a plane taken along a length and width of the housing 18.

With reference now to FIGS. 5-8, an operation of the electric junction box assembly 10 is provided. FIG. 5 depicts the angle of insertion, as indicated by the solid arrow" for the cover 38. As depicted in FIG. 6 and described above, the width "$W_I$" of the intermediate portions 52 is greater than a height "$H_O$" of the opening 34. Yet, a thickness "$T_I$" of the intermediate portions (as measured by the distance from a top to a bottom surface of the guides 58) is slightly smaller than the height "$H_O$" of the opening 34. As such, the axial rod 44 must be positioned such that the thickness "$T_I$" of the intermediate portions 52 are presented and inserted into the openings 34 of the supports 28.

Figure 7:
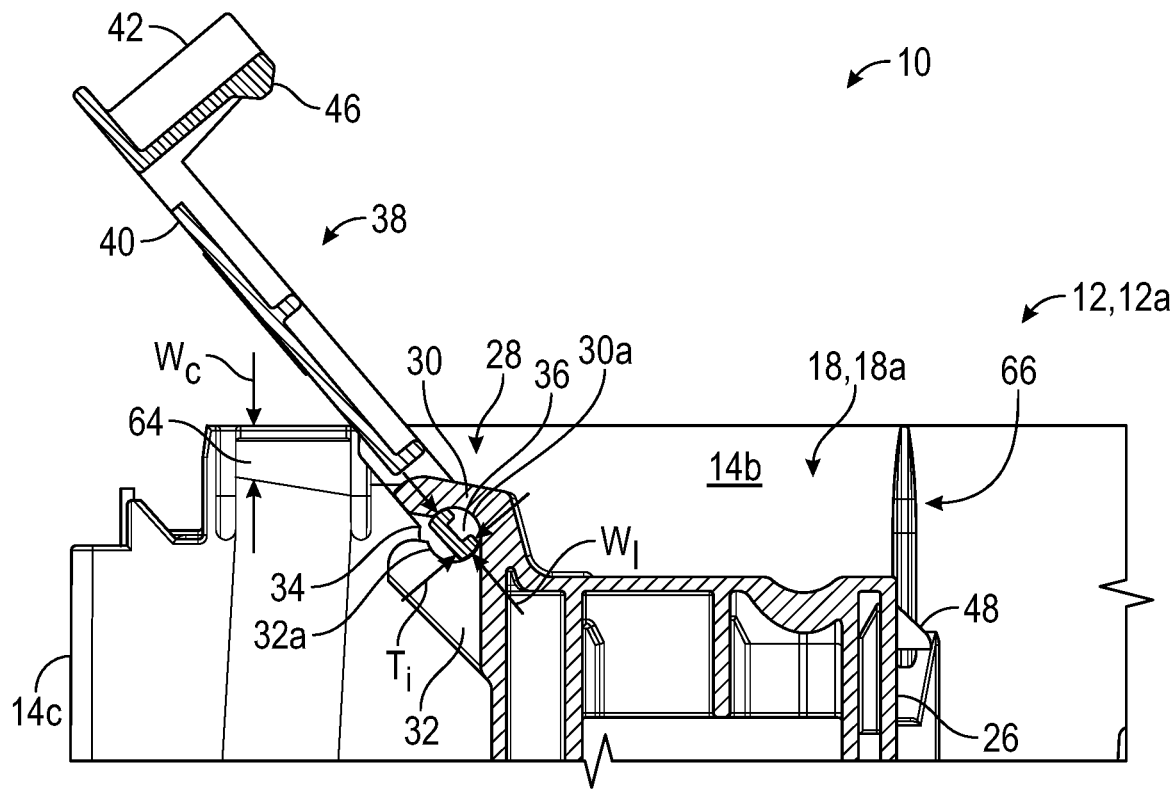
FIG. 7 is a view of FIG. 6 showing the cover abutting against the resilient stop.

FIGS. 6 and 7 depict the cover 38 inserted into the opening 34 and the guides 58 are seated against the inner arcuate surface 32a of the lower support member 32. FIGS. 6 and 7 illustrate how the outer surface of the guides 58 cooperate with the hole 36, and in particular the inner arcuate surface 30a of the upper support member 30 and the inner arcuate surface 32a lower support member 32 to facilitate the rotation of the cover 38. Further, as the axial rod 44 is rotated, the thickness "$T_I$" of the intermediate portions 52 are no longer aligned with the height of the opening 34.

Figure 8:
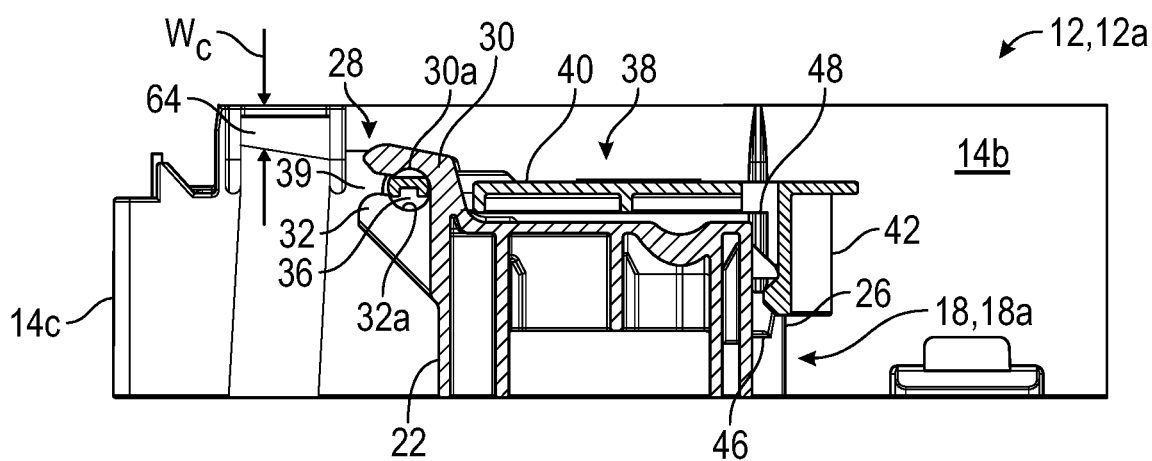
FIG. 8 is a view of FIG. 6 showing the cover in a closed position.

FIG. 8 depicts the cover 38 in the closed position. In the closed position, it is shown that the axial rod is positioned such that the guides 58 project downwardly. The opening 34 is illustratively shown as being approximately 10 degrees from a plane taken along a length and width of the housing 18. As such, the intermediate portion 52 of the axial rod 44 is recessed beneath the opening 34, making it difficult for the axial rod 44 to be displaced. FIG. 8 further depicts the first catch 46 of the first attachment piece 42 engaged with the second catch 48 disposed on the front wall 26 of the housing 18. For illustrative purposes, the first catch 46 is a ramp shaped member and the second catch 48 is also a ramp shaped member which are oriented in a complimentary manner as to engage each other and retain the cover 38 in the closed position.

Figure 9:
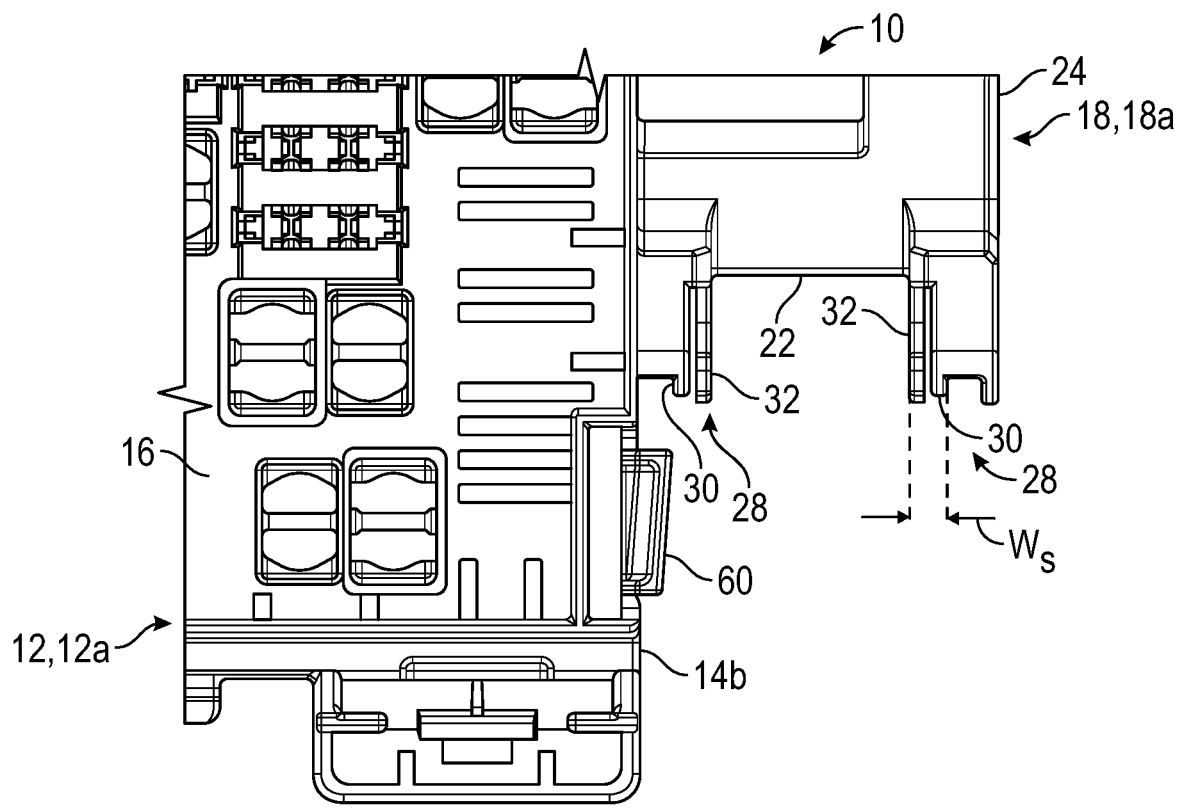
FIG. 9 is a top down view of FIG. 4.

With reference now to FIG. 9, another aspect of the electrical junction box assembly 10 is provided. In such an aspect, the case 12 includes a resilient stop 60. The resilient stop 60 is disposed on the first wall 14 and adjacent the back wall 22 of the housing 18. In one aspect, the resilient stop 60 is integrally formed with the first wall 14. A slot 62 is disposed behind the resilient stop 60 so as to provide a space for the resilient stop 60 to occupy. A distal end of the resilient stop 60 extends beyond the first wall 14 so as to limit a rotation of the cover 38. The resilient stop 60 is formed of a material configured to naturally return the resilient stop 60 to a resting position as shown in FIG. 9.

Figure 10:
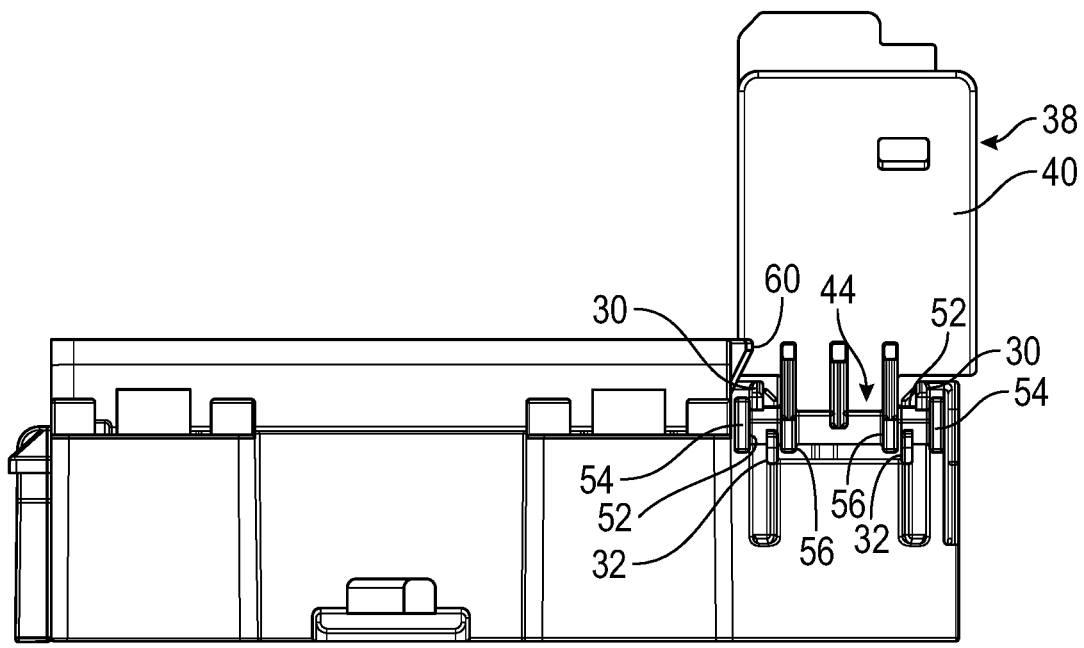
FIG. 10 is a perspective view of the junction box assembly taken from the back.

With reference now to FIGS. 7 and 10, the resilient stop 60 is configured to prevent the cover 38 from being rotated past the resilient stop 60. The resilient stop 60 includes a cam surface 64. The cam surface 64 is angled outwardly with respect to the first wall 14. In one aspect, the cam surface 64 tapers from a distal end to a proximal end. In particular, the width "$W_C$" of the cam surface 64 is wider at proximal end (which is adjacent to the support 28) relative to the distal end (which is closer to the back portion 14c of the first wall 14 than the proximal end).

With reference again to FIGS. 5-7, an operation of the resilient stop 60 is provided. The cover 38 is inserted into the opening 34 along the insertion direction indicated by the dashed arrow shown in FIG. 5. As described above, the insertion direction is necessitated by the height "$H_O$" of the opening 34 with respect to the thickness "$T_I$" and width "$W_I$" of the intermediate portions 52, wherein the thickness "$T_I$" of the intermediate portions must be presented to the opening 34 so as to fit within the opening 34. Consequently, the alignment direction places the cover 38 underneath the cam surface 64 of the resilient stop 60, as shown in FIG. 6. The resilient stop 60 is in a resting position, wherein the resilient stop 60 blocks the path of travel of the cover 38.

The cover 38 is then rotated to the closed position, wherein the cover 38 engages the cam surface 64 of the resilient stop 60 displacing the resilient stop 60 into the slot 62, wherein the resilient stop 60 is displaced from the path of travel of the cover 38. At FIG. 7, the cover 38 is rotated past the resilient stop 60 and the resilient stop 60 is free to return to the resting position. Consequently, the cover 38 cannot be accidentally dislodged from the housing 18 in the open position as shown in FIGS. 7 and 11 as the intermediate portion 52 of the axial rod 44 is in a position wherein the thickness "$T_I$" of the intermediate portion 52 is misaligned to the opening 34, preventing the axial rod 44 from being removed. Further, the resilient stop 60 prevents the cover 38 from rotating further to assume a position where the thickness "$T_I$" of the intermediate portion 52 is aligned with the opening 34.

In yet another aspect, the electric junction box includes a rib 66 disposed on the first wall 14. The rib 66 is an elongated member which projects outwardly from the first wall 14. The rib 66 may ramp up from the top portion to the body of the rib 66, wherein a top portion of the rib 66 is flush with the first wall 14. The rib 66 has a dimension configured to engage a peripheral edge of the cover 38. The rib prevents the cover 38 from rattling due to environmental forces which may cause the cover 38 to vibrate.

Various aspects of the electric junction box assembly 10 is provided herein and each aspect may be practiced in combination with each other or singularly. As discussed above, the housing 18 houses an element 20, an element 20 may be housed by the housing 18, illustratively including a jump start bolt 20a, an electric connector, a fuse, a switch or any other element which may be suitable or desired for facilitating power distribution within a system, such as an electrical system of an automotive vehicle. In the context where the element 20 is a jump start bolt 20a, the housing 18, may be referred to as a jump start housing 18a.

In such an aspect, the electric junction box assembly 10 includes a jump start housing 18a and a cover 38. The jump start housing 18a is disposed on an outer surface of the first wall 14. The jump start bolt is disposed within the jump start housing 18a. The jump start housing 18a includes a back wall 22, an outer side wall 24, and a front wall 26. The jump start housing 18a further includes a pair of supports 28 disposed on the back wall 22. The supports 28 are spaced apart from each other. Each of the supports 28 includes an upper support member 30 and a lower support member 32. The upper support member 30 and the lower support member 32 are spaced apart from each other so as to define an opening 34. The upper support member 30 has an arcuate inner surface and the lower support member 32 has an arcuate inner surface each having a radius greater than the opening 34.

While particular embodiments have been illustrated and described herein, it should be appreciated and understood that various other changes and modifications may be made without departing from the spirit and scope of the claim subject matter. Moreover, although various aspects of the claim subject matter have been described herein, such aspects need not be utilized in combination. It is therefore intended that the appended claims cover all such changes and modifications that are within the scope of the claim subject matter.

The invention claimed is:

1. An electric junction box assembly configured to house an element, the electric junction box assembly comprising:
   a case having a first wall bounding a space for holding a plurality of electric components;
   a housing disposed on an outer surface of the first wall, the element disposed within the housing, the housing including a back wall, an outer side wall, and a front wall, the housing further including a pair of supports disposed on the back wall of the housing and spaced apart from each other, each of the pair of supports includes an upper support member and a lower support member spaced apart from each other so as to define an opening, the upper support member has an arcuate inner surface and the lower support member has an arcuate inner surface each having a radius greater than the opening; and a cover having an axial rod, the axial rod includes a pair of intermediate portions, the pair of intermediate portions have a thickness which is smaller than a height of the opening and a width which is greater than the height of the opening, wherein a rotation of the axial rod prevents the cover from being dislodged from the opening.

2. The electric junction box assembly as set forth in claim 1, wherein the upper support member and the lower support member are offset from each other along a width of the housing.

3. The electric junction box assembly as set forth in claim 1, wherein the axial rod includes a pair of peripheral stops and a pair of inner stops, wherein each of the pair of intermediate portions is disposed between a corresponding one of the pair of peripheral stops and the pair of inner stops.

4. The electric junction box assembly as set forth in claim 3, wherein each of the pair of intermediate portions includes a pair of guides spaced apart from each other and opposite of each other.

5. The electric junction box assembly as set forth in claim 4, wherein each of the pair of guides are arcuate and have a radius generally equal to a radius of the arcuate inner surface of the upper support member and the lower support member.

6. The electric junction box assembly as set forth in claim 1, wherein the case includes a resilient stop disposed on the first wall and adjacent the back wall of the housing.

7. The electric junction box assembly as set forth in claim 6, wherein a distal end of the resilient stop extends beyond the first wall so as to limit a rotation of the cover.

8. The electric junction box assembly as set forth in claim 7, wherein the resilient stop includes a cam surface, the cam surface is angled outwardly with respect to the first wall.

9. The electric junction box assembly as set forth in claim 1, further including a rib disposed on the first wall, the rib having a dimension configured to engage a peripheral edge of the cover.

10. An electric junction box assembly configured to house a jump start bolt, the electric junction box assembly comprising:

an upper case having a first wall bounding a space for holding electric components;

a jump start housing disposed on an outer surface of the first wall, the jump start bolt disposed within the jump start housing, the jump start housing including a back wall, an outer side wall, and a front wall, the jump start housing further including a pair of supports disposed on the back wall of the jump start housing and spaced apart from each other, each of the pair of supports includes an upper support member and a lower support member spaced apart from each other so as to define an opening, the upper support member has an arcuate inner surface and the lower support member has an arcuate inner surface each having a radius greater than the opening; and a cover having an axial rod, the axial rod includes a pair of intermediate portions, a top surface and a bottom surface of the pair of intermediate portions define a thickness which is smaller than a height of the opening and the pair of intermediate portions have a width which is greater than the height of the opening, wherein a rotation of the axial rod prevents the cover from being fitted within the opening.

11. The electric junction box assembly as set forth in claim 10, wherein the axial rod includes a pair of peripheral stops and a pair of inner stops, wherein each of the pair of intermediate portions is disposed between a corresponding one of the pair of peripheral stops and the pair of inner stops.

12. The electric junction box assembly as set forth in claim 10, further including a rib disposed on the first wall, the rib having a dimension configured to engage a peripheral edge of the cover.

13. The electric junction box assembly as set forth in claim 10, wherein the upper support member and the lower support member are offset from each other along a width of the housing.

14. The electric junction box assembly as set forth in claim 10, wherein the opening is offset between 5 and 15 degrees from a plane taken along a length and width of the jump start housing.

15. The electric junction box assembly as set forth in claim 10, wherein each of the pair of intermediate portions includes a pair of guides spaced apart from each other and opposite of each other.

16. The electric junction box assembly as set forth in claim 15, wherein each of the pair of guides are arcuate and have a radius generally equal to a radius of the arcuate inner surface of the upper support member and the lower support member.

17. The electric junction box assembly as set forth in claim 10, wherein the upper case includes a resilient stop disposed on the first wall and adjacent the back wall of the housing.

18. The electric junction box assembly as set forth in claim 17, wherein a distal end of the resilient stop extends beyond the first wall so as to limit a rotation of the cover.

19. The electric junction box assembly as set forth in claim 17, wherein the resilient stop includes a cam surface, the cam surface is angled outwardly with respect to the first wall.

20. The electric junction box assembly as set forth in claim 19, wherein the cam surface is tapers from a distal end to a proximal end.

* * * * *